July 21, 1964   R. J. DONOGHUE   3,141,574
CONTAINER FOR DISPENSING SELECTED QUANTITIES OF FLUID
Filed April 22, 1963
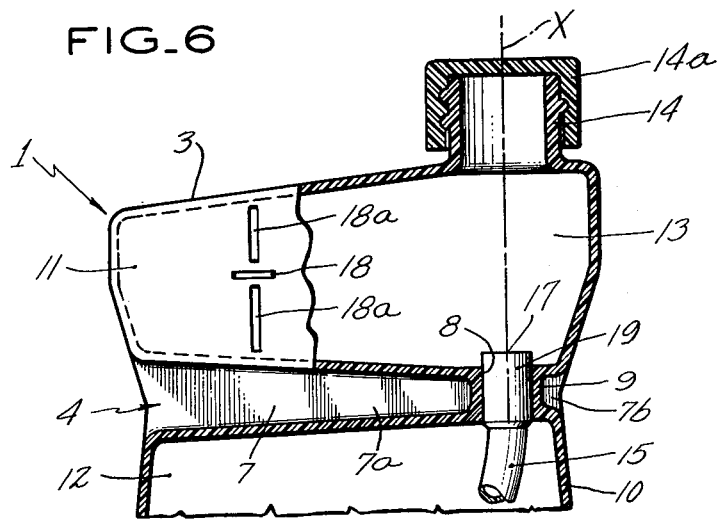
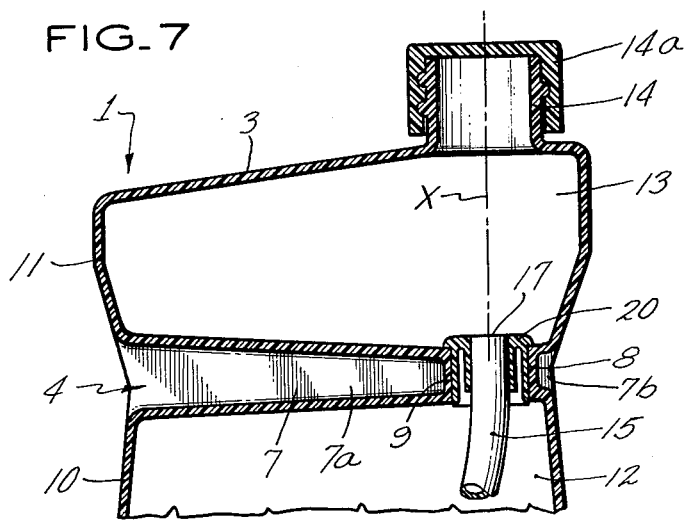
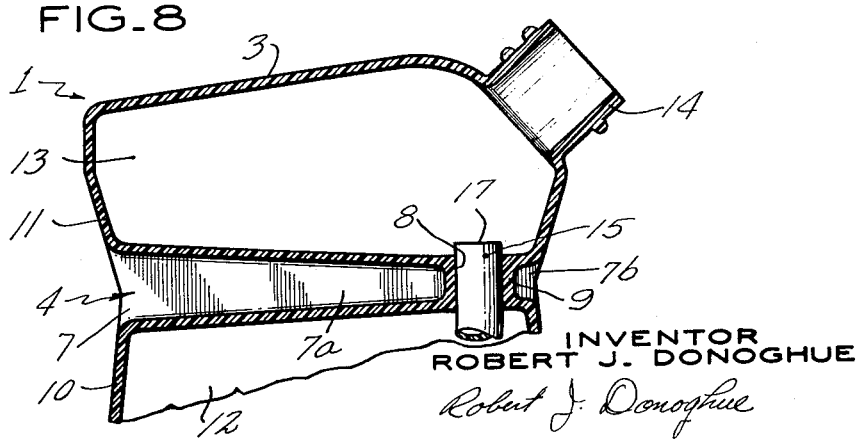
INVENTOR
ROBERT J. DONOGHUE
Robert J. Donoghue

United States Patent Office 3,141,574
Patented July 21, 1964

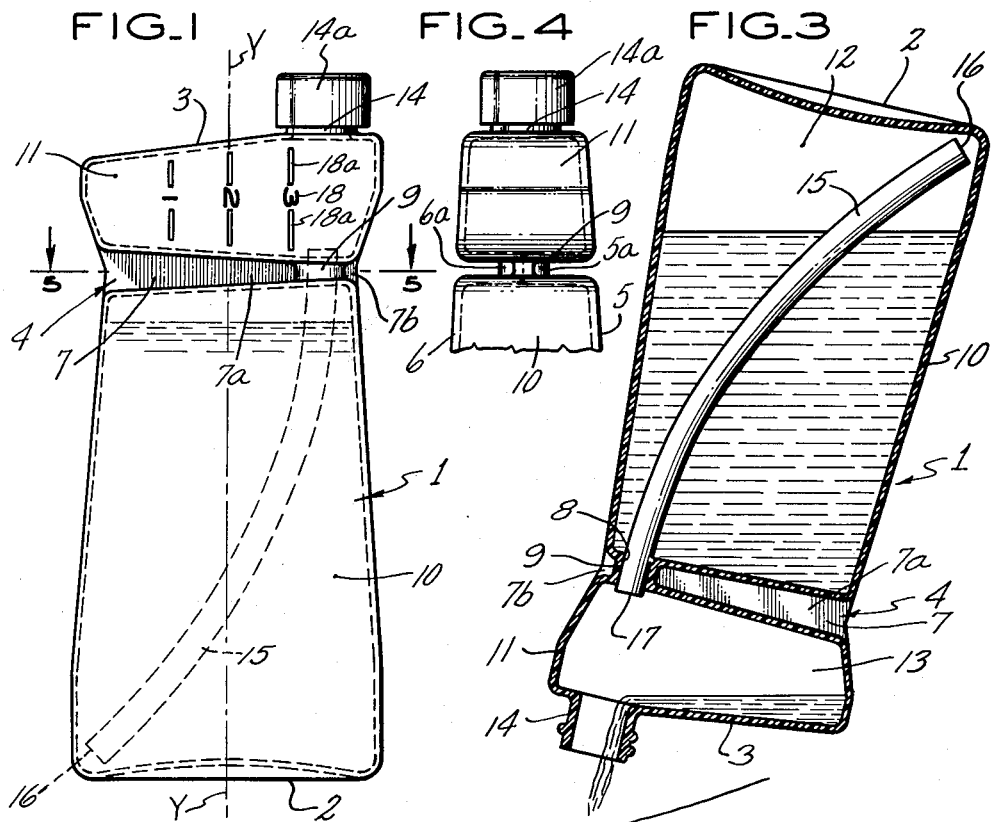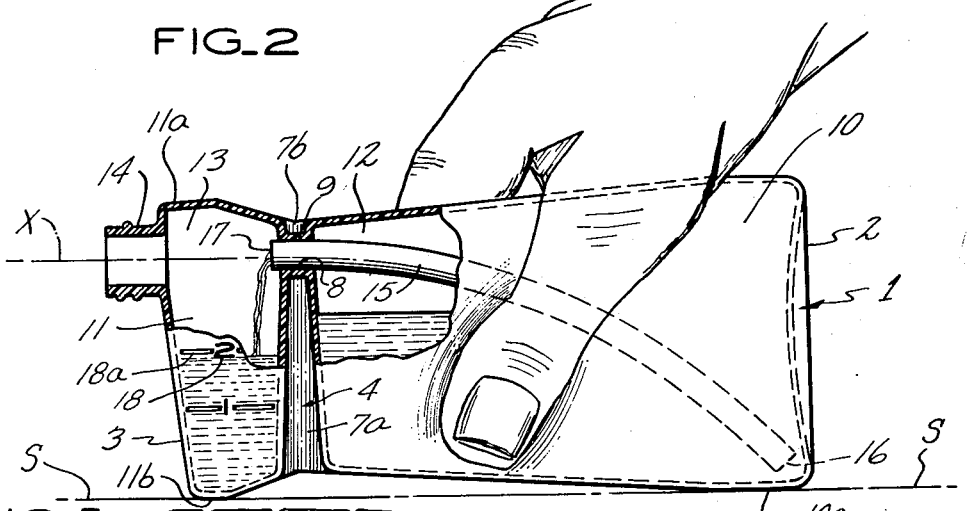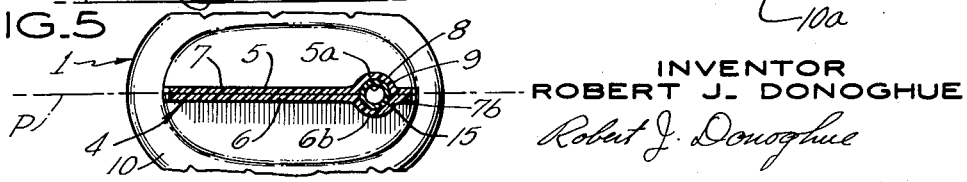

3,141,574
CONTAINER FOR DISPENSING SELECTED QUANTITIES OF FLUID
Robert J. Donoghue, 900 Windsor Ave., Windsor, Conn.
Filed Apr. 22, 1963, Ser. No. 274,698
13 Claims. (Cl. 222—157)

This invention pertains to a container for dispensing selected quantities of fluid. In particular it pertains to such a container having flexible side walls which is fabricated from a plastic material such as polyethylene.

Containers provided with separately defined reservoirs to facilitate the dispensing of metered quantities of fluid or fluid-like materials are well known. However, heretofore such devices have generally been characterized by structural complexity and difficulty in manufacturing. In addition, many devices of this nature are awkward or cumbersome to manipulate when dispensing predetermined or metered amounts of material.

Other disadvantages commonly associated with many previously developed metering types of dispensers or containers have involved a lack of over-all structural strength, metering reservoirs having rigid side walls, metering reservoirs fabricated as separate assemblies which were thereafter incorporated in a container or dispenser, and metering reservoirs which were shielded from a user by multiple wall thicknesses.

Rigid walls in a metering reservoir prevent the dispensing of material from the reservoir by the simple expedient of squeezing the reservoir wall portions. The positioning of multiple wall thicknesses between such a reservoir and a user makes it difficult or impossible to ascertain to what extent a reservoir has been filled or emptied. The fabrication of a metering reservoir as a separate assembly contributes substantially to the complexity of a dispensing container and thus increases the cost of fabrication of such a container.

Recognizing the disadvantages associated with previously developed metering dispensers, it is an object of this invention to provide such a container or dispenser which substantially obviates the problems of the type heretofore described.

It is a particular object of the invention to provide a container for dispensing selected quantities of fluid material, such as liquid or fluid powder, which is unitary in character and includes an enclosed metering reservoir fabricated as an integral portion of the over-all container.

It is an additional object of the invention to provide such a container wherein the metering reservoir has flexible side walls.

It is also an object of the invention to provide such a metering dispenser wherein container walls which would shield a metering reservoir from a user are avoided.

An additional object of the invention is to provide a metering container or dispenser including integral reinforcing means between the main body cavity and a metering reservoir or cavity.

In describing the invention for accomplishing the foregoing objects, reference will be made to the accompanying drawings in which:

FIGURE 1 is a side elevational view of a preferred embodiment of a container of the present invention;

FIGURE 2 is a partially sectioned illustration showing the mode of filling the metering reservoir of the FIGURE 1 container;

FIGURE 3 is a partially sectioned view illustrating the mode of dispensing material from the metering reservoir of the FIGURE 1 container;

FIGURE 4 is a fragmentary, end elevational view of the FIGURE 1 container as viewed from the right in FIGURE 1;

FIGURE 5 is a sectional view illustrating a reinforcing portion of the FIGURE 1 container as viewed along the section line 5—5;

FIGURE 6 is an enlarged, fragmentary and partially sectioned view of an alternative embodiment of the metering reservoir portion of the FIGURE 1 container;

FIGURE 7 illustrates a further modification of the FIGURE 1 structure; and

FIGURE 8 illustrates a still further modification of the FIGURE 1 structure within the purview of the present invention.

In FIGURES 1–6 there is illustrated a container constructed according to the teachings of this invention. This container 1 is fabricated from a plastic material such as polyethylene. The wall thickness of the container is such that the walls are flexible in character while retaining the fabricated shape of the container. In this sense the structure of the container corresponds generally to the structure of conventional squeeze bottles now commercially available and utilized for the dispensing of materials such as cosmetics, deodorants and the like.

It is contemplated that the container 1 will be fabricated by blow molding, article forming techniques. An extruded parison employed to form the container 1 is closed at the base 2 of the container 1 and the upper end 3 of the container. Air supplied to the interior of the thus confined parison will expand the parison into the general shape of the container shown in FIGURE 1. During the fabricating operation, at an intermediate portion 4 of the container 1, opposite side walls 5 and 6 will be pressed together while the parison is still in a plastic condition to effect the fusing or forming of these side wall portions to form reinforcing web means 7. Web means 7 as shown in FIGURE 5 has a double wall thickness, i.e. a thickness substantially equal to twice the wall thickness of the container, and is formed by the joined portions of walls 5 and 6. As shown in FIGURES 1 and 5, reinforcing means 7 extends longitudinally of the central axis of the container 1 and is aligned centrally of the container so as to be symmetrically aligned with respect to the plane of symmetry P shown in edge view in FIGURE 5. Web means 7 may include, as illustrated in FIGURE 1, a portion 7a which is transversely spaced from another portion 7b. Portions 7a and 7b are interconnected by unjoined portions 5a and 6a of the walls 5 and 6 which cooperate to define a cylindrical passage 8. Wall portions 5a and 6a also define connecting means 9 extending between a first body portion 10 disposed beneath the web or reinforcing means 7 as shown in FIGURE 1 and a second body portion 11 disposed above the web or reinforcing means 7.

The first body portion 10 includes flexible wall means which define a body cavity 12 which functions as a principal reservoir for fluid material such as liquid or powder to be dispensed from the container. The second body portion 11 defines a second body cavity 13 also having flexible side walls. Body cavity 13 functions as a metering reservoir to enable the dispensing of predetermined quantities of material from the container. As illustrated, body portions 10 and 11 are joined by the connecting portion 9 which provides the passage 8 for affording fluid communication between the body cavities 12 and 13. Web means 7a and 7b provide reinforcement extending between the joined portions 10 and 11 so as to reinforce the overall container structure and provide integrity for the container.

As illustrated, the body portions 10 and 11, the connecting portion 9 and the reinforcing web means 7 are integral or unitary in character and fabricated from a single parison during the container forming operation.

Body portion 11 is provided with a material outlet 14 which may be a conventional externally threaded container neck as illustrated in FIGURE 2. A conventional internally threaded cap (14a) may be provided for the outlet 14 as shown in FIGURES 1 and 4. The outlet 14 has a cylindrical axis X which is generally perpendicular to the base 2, i.e. the lower supporting surface of the container, and is positioned adjacent one end of the container, i.e. the right end wall of the container, as illustrated in FIGURE 1. This outlet axis X preferably is aligned with the plane of symmetry P of the container 1. Preferably the axis X of the outlet 14 is coaxial with the axis of the connecting passage 8.

As shown in FIGURES 1, 4, and 5 the first and second body portions 10 and 11 are oblong or elongate in cross-section configuration so as to have side wall portions of greater width, i.e. lateral length, than the width of the end walls of these portions.

Body cavities 12 and 13 may be connected by a conduit means 15 which has an inlet 16 in the base of the cavity 12 and an outlet 17 in the body cavity 13. Conduit 15 passes through passage 8 in sealed relation with the wall means 5a and 6a as shown in FIGURE 5.

The metering reservoir or second body portion 11 may be provided with indicia 18 to indicate the amount of material contained within the cavity 13, as illustrated in FIGURE 1. In a preferable arrangement shown, the indicia 18 extend laterally or transversely of the axis X of the outlet 14. Where the container is fabricated from translucent plastic, the indicia and the illustrated associated markings 18a may be printed or otherwise formed of opaque material on the outer periphery and body portion 11. Where the container is printed or painted so as to be opaque, unprinted areas may define the indicia markings 18a so that a user may view the extent to which material occupies the cavity 13.

In utilizing the container illustrated in FIGURES 1–5 to dispense predetermined quantities of fluid, the container is placed on one end as shown in FIGURE 2 and the side walls of the body portion 10 squeezed inwardly. As a result of this squeezing action, fluid is forced from the cavity 12 into the inlet 16 of the conduit 15 and out of the conduit outlet 17 into the metering cavity 13. As will be appreciated, under certain conditions, this material transfer may be effected where the conduit 15 is not present.

As will be appreciated, this mode of transfer of fluid from the main or storage cavity 12 to the metering cavity 13 is facilitated by the illustrated arrangement of the conduit 15 and the configuration of end wall portions of the container. As shown in FIGURE 2, the conduit 15 enters the metering cavity 13 close to, i.e. substantially adjacent, one end wall 11a. On the end of the container opposite to that bearing the end wall 11a there are formed end wall portions 11b and 10a which may be flat and coplanar, whereby the container may be supported on one end when resting on a surface such as the horizontal surface S. When thus supported, the outlet 17 of the conduit 15 and the container outlet 14, both being located adjacent the end wall 11a, are disposed in the upper end of the metering cavity 13. In this position the indicia 18 and associated indicia markings 18a, which extend transversely of the container longitudinal axis Y, extend consecutively, generally vertically upwardly away from the surface S. With this arrangement of container elements, it will be appreciated that the container may be firmly supported on the surface S while fluid is being transferred from the main reservoir 12 to the metering reservoir 13. With the illustrated, elongate container lying on one end, its center of gravity is lowered such that the container is inherently stabilized. Thus, after the fluid transfer has taken place, the container may remain stably supported on one end until it is desired to dispense the contents of the metering reservoir 13.

The contents of the cavity 13 may be dispensed by inverting the container as shown in FIGURE 3 to allow the contents of the reservoir 13 to flow by gravity out of the outlet 14. As will be appreciated, when the container is thus inverted, the inlet 16 which lies adjacent the base portion 2 of the body portion 10 will lie above the level of liquid within the cavity 12 so as to prevent the dispensing of material from the cavity 12 while the contents of the metering cavity 13 are being emptied.

As will be appreciated, the contents of the cavity 13 may be dispensed by squeezing the side wall of the body portion 11 while the container is positioned as shown in FIGURES 2 or 3. The squeezing of the side walls of the metering cavity 13 may be of particular consequence when dispensing viscous material, or when it is desired to agitate or mix the contents of this cavity. If the outlet 14 should be provided with a conventional atomizing type outlet, this squeezing action will facilitate the dispensing of the metering reservoir or body 13 in an atomized, intermittent fashion.

In the container illustrated in FIGURES 1–5 the conduit 15 is illustrated as having a continuously uniform wall thickness. If desired, as shown in FIGURE 6, the upper end of the conduit 15 may be provided with an integral, enlarged portion 19 so as to facilitate the insertion or installing of the conduit 15. Enlarged conduit portion 19 may be secured within the connecting passage 8 defined by wall means 5a and 6a by a press fit if desired. As will be appreciated, the enlarged portion 19 will allow for a relatively enlarged passage 8 so as to facilitate the filling of the body portion 10 with material prior to the installing of the conduit 15 as well as the removal of plastic chips from the interior of the cavity 12, which chips may have been formed during the container fabricating operation.

A modification somewhat similar to that involved in FIGURE 6 is illustrated in FIGURE 7. In the FIGURE 7 arrangement, in lieu of an integral enlarged portion 19, a separate annular seal 20 is disposed between the conduit 15 and the side walls 5a and 6a for defining the interconnecting passage 8 which extends between the body cavities 12 and 13.

For certain purposes it may be desirable to have an outlet 14, the axis of which is inclined relative to the container axis. Such an inclined outlet axis arrangement is illustrated in FIGURE 8. However, as will be appreciated, the arrangements illustrated in FIGURES 1, 6 and 7, wherein the outlet axis X is coaxial with the axis of the passage 8, afforded particular advantages. With this arrangement the filling of the cavity 12 and the installing of the conduit 15 is particularly facilitated.

In describing the structure and operation of a container constructed according to the invention, several advantages of the invention have been made apparent. The integral and unitary structure of the container provides for a simplified metering container which may be fabricated with maximum ease. Dispensing metered quantities of fluid may be expeditiously accomplished with minimum but positive manipulative steps. The necessity of assembling a separate metering reservoir within a main container body is entirely avoided. Thus the possibility of material leakage associated with complex, multiple component dispensing structures is avoided.

The flexible character of both the main body portion 10 and the dispensing or metering body portion 11 particularly facilitates the dispensing of difficult to handle materials. In addition, the flexible character of the walls of the dispensing body portion 11 enables the contents of the reservoir 13 to be agitated prior to being dispensed.

The single wall thickness of the dispensing portion 11 provides for minimum wall thickness of this body portion so as to insure the ability of a user to readily view the contents of the cavity 13.

The double wall thickness, web means 7 constitutes an integral reinforcing means for the container and effectively joins the body portions 10 and 11 and provides for over-all container strength.

The described arrangement of conduit and container end wall components enables the metering reservoir to be filled while the container is positioned in a posture of maximum stability.

While the invention has been described with reference to preferred embodiments, it will be appreciated that modifications, additions, substitutions and deletions with respect to the described structure may be made within the purview of the invention as defined in the appended claims.

What is claimed is:

1. A container for dispensing selected quantities of fluid, said container comprising:
   a first body portion having flexible wall means defining a first body cavity;
   a second body portion having flexible wall means defining a second body cavity;
   connecting means between said first body portion and said second body portion comprising passage means providing communication between said first and said second body cavities;
   conduit means having an inlet in said second body portion and an outlet in said first body portion, said conduit means passing through said passage means of said connecting portion in sealed relation therewith;
   web means extending laterally of said connecting means and integrally joined with the flexible wall means of said first and second body portions, said web means extending between said first and second body portions;
   said first body portion, said web means, said connecting means, and said second body portion comprising integral portions of a unitary body; and
   outlet means in said first body portion.

2. A container for dispensing selected quantities of fluid, said container comprising:
   a first body portion having flexible wall means defining a first body cavity;
   a second body portion having flexible wall means defining a second body cavity;
   connecting means between said first body portion and said second body portion comprising passage means providing communication between said first and said second body cavities;
   web means extending laterally of said connecting means and integrally joined with the flexible wall means of said first and second body portions, said web means extending between said first and second body portions;
      said web means having a thickness approximately twice that of said flexible wall means of said first and said second body portions and extending laterally from opposite sides of said connecting means;
      said web means and said connecting means being disposed so as to be substantially symmetrically aligned with respect to a common plane of symmetry of said first and said second body portions;
   said first body portion, said web means, said connecting means, and said second body portion comprising integral portions of a unitary body; and
   outlet means in said first body portion.

3. A container for dispensing selected quantities of fluid, said container comprising:
   a first body portion having flexible wall means defining a first body cavity;
   a second body portion having flexible wall means defining a second body cavity;
   connecting means between said first body portion and said second body portion comprising passage means providing communication between said first and said second body cavities;
   web means extending laterally of said connecting means and integrally joined with the flexible wall means of said first and second body portions, said web means extending between said first and second body portions;
   said first body portion, said web means, said connecting means, and said second body portion comprising integral portions of a unitary body;
   outlet means in said first body portion;
   said outlet means being generally cylindrical in configuration and having a cylindrical axis which extends generally perpendicular to a base of said second body portion and is disposed on a top wall of said first body portion adjacent an end wall thereof;
   said first and said second body portions being oblong in cross-sectional configuration so as to have side walls of greater width than the width of body portion end walls; and
   said passage means of said connecting means being generally axially aligned with said outlet.

4. A container for dispensing selected quantities of fluid, said container comprising:
   a first body portion having flexible wall means defining a first body cavity;
   a second body portion having flexible wall means defining a second body cavity;
   connecting means between said first body portion and said second body portion comprising passage means providing communication between said first and said second body cavities;
   web means extending laterally of said connecting means and integrally joined with the flexible wall means of said first and second body portions, said web means extending between said first and second body portions;
   said first body portion, said web means, said connecting means, and said second body portion comprising integral portions of a unitary body;
   outlet means in said first body portion;
   said outlet means being cylindrical in configuration and having an axis which is inclined relative to a base of said second body portion, said outlet means also being disposed on a top wall of said first body portion adjacent one end wall thereof; and
   said first and said second body portions being oblong in cross-sectional configuration so as to have side walls having a width greater than the width of body portion end walls.

5. A container for dispensing selected quantities of fluid, said container comprising:
   a first body portion having flexible wall means defining a first body cavity;
   a second body portion having a flexible wall means defining a second body cavity;
   connecting means between said first body portion and said second body portion comprising passage means providing communication between said first and said second body cavities;
   web means extending laterally of said connecting means and integrally joined with the flexible wall means of said first and second body portions, said web means extending between said first and second body portions;
   said first body portion, said web means, said connecting means, and said second body portion comprising integral portions of a unitary body;
   outlet means in said first body portion;
   at least some portion of said first body portions being sufficiently light transmitting that the contents thereof may be veiwed from its exterior; and
   said container including multiple indicia on said first body portion aligned so as to extend consecutively, generally transversely of the axis of said outlet means.

6. A container as described in claim 1 wherein said conduit means has an enlarged integral portion providing a seal with said passage means of said connecting means.

7. A container as described in claim 1 including an annular seal between said conduit means and said passage means of said connecting means.

8. A container as described in claim 1:
   wherein said web means has a thickness approximately twice that of said flexible wall means of said first and said second body portions and extends laterally from opposite sides of said connecting means; and wherein said web means and said connecting means are disposed so as to be substantially symmetrically aligned with respect to a common plane of symmetry of said first and said second body portions.

9. A container described in claim 8:

wherein said outlet is generally cylindrical in configuration and has a cylindrical axis which extends generally perpendicular to a base of said second body portion and is disposed on a top wall of said first body portion adjacent an end wall thereof;

wherein said first and said second body portions are oblong in cross-sectional configuration so as to have side walls of greater width than the width of body portion end walls; and wherein said passage means of said connecting means is generally axially aligned with said outlet.

10. A container as described in claim 9:

wherein at least some portion of said first body portions are sufficiently light transmitting that the contents thereof may be viewed from its exterior; and wherein said container includes multiple indicia on said first body portion aligned so as to extend consecutively, generally transversely of the axis of said outlet.

11. A container as described in claim 1 wherein said conduit means enters said first body portion substantially adjacent one end wall thereof; and said outlet means of said first body portion is disposed substantially adjacent said one end wall; said container including end wall means on a container end opposite to the container end where said one end wall is located, whereby said container may be supported on a horizontal surface by said end wall means.

12. A container as described in claim 11 including a plurality of indica formed on at least one side wall of said first body portion and extending generally transversely of the longitudinal axis of said container such that, when said container is supported by said end wall means on a horizontal surface, said indicia extend consecutively, generally vertically of said horizontal surface.

13. A container as described in claim 10 wherein said conduit means enters said first body portion substantially adjacent one end wall thereof; and said outlet means of said first body portion is disposed substantially adjacent said one end wall; said container including end wall means on a container end opposite to the container end where said one end wall is located, whereby said container may be supported on a horizontal surface by said end wall means.

References Cited in the file of this patent

UNITED STATES PATENTS

| 2,730,270 | Hernimann | Jan. 10, 1956 |
| 2,743,849 | Elsas | Mar. 1, 1956 |
| 2,761,833 | Ward | Sept. 4, 1956 |
| 2,836,329 | Chenette | May 27, 1958 |
| 3,029,001 | Blish | Apr. 10, 1962 |
| 3,089,623 | Padzieski | May 14, 1963 |
| 3,094,250 | Molyneaux | June 18, 1963 |

FOREIGN PATENTS

| 852,522 | Great Britain | Oct. 26, 1960 |